United States Patent [19]

Frechtmann

[11] Patent Number: 4,528,227

[45] Date of Patent: Jul. 9, 1985

[54] MOSAIC STYLE ARTWORK

[76] Inventor: Jean Frechtmann, 400 E. 56th St., New York, N.Y. 10022

[21] Appl. No.: 482,044

[22] Filed: Apr. 4, 1983

[51] Int. Cl.³ .......................... B29C 5/08; B29D 9/00

[52] U.S. Cl. .................................... 428/49; 264/245; 264/255; 428/167; 428/451

[58] Field of Search ............... 264/257, 258, 255, 245, 264/246, 247, 60; 428/167, 451, 702, 49; 429/482, 412.5, 419.4, 312.6; 52/390, 315, 309.1, 309.13, 309.16

[56] References Cited

U.S. PATENT DOCUMENTS

| | | | |
|---|---|---|---|
| 1,612,825 | 1/1927 | Lynch | 264/255 |
| 2,779,975 | 2/1957 | Lee et al. | 264/257 |
| 3,346,674 | 10/1967 | Kidder et al. | 264/1.9 |
| 3,546,832 | 12/1970 | Smith | 52/309.16 |
| 3,600,485 | 8/1971 | Brauner | 264/257 |
| 3,832,264 | 8/1974 | Barnette | 52/315 |
| 3,895,155 | 7/1975 | Shukuri et al. | 428/702 |
| 4,137,365 | 1/1979 | Fletcher et al. | 428/451 |
| 4,150,478 | 4/1979 | Yevick | 264/1.9 |
| 4,196,246 | 4/1980 | Takayama et al. | 428/451 |

FOREIGN PATENT DOCUMENTS

| | | | |
|---|---|---|---|
| 505430 | 9/1952 | Belgium | 264/246 |
| 640769 | 1/1935 | Fed. Rep. of Germany | 264/255 |
| 476905 | 6/1968 | Japan | 264/245 |

*Primary Examiner*—Willard E. Hoag

*Attorney, Agent, or Firm*—Gottlieb, Rackman & Reisman

[57] ABSTRACT

A pearlized plastics mosaic article having a ceramic glaze thereover is made in a mold having a deep etched pattern of engravings to provide a relief casting having a pattern of grooves simulating the look of mosaic tiles. An ornamental mosaic finish is obtained by casting mosaic and background layers of thermoset materials. For contrast and definition of the mosaic ornamentation, the thermoset layers are cast of materials having different color pigmentations and material textures. In the molding process, the first thermoset layer is cast to a depth which is less than the height of mold engravings. After curing the first layer to a gel consistency, the second background layer of thermoset material is cast in overlying relation to the first thermoset layer and mold engravings. The thermoset materials are then cured and demolded to provide an integral mosaic casting.

4 Claims, 15 Drawing Figures

FIG. 1
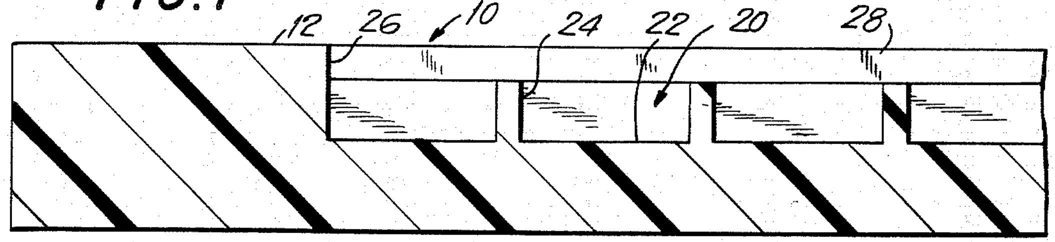
FIG. 2
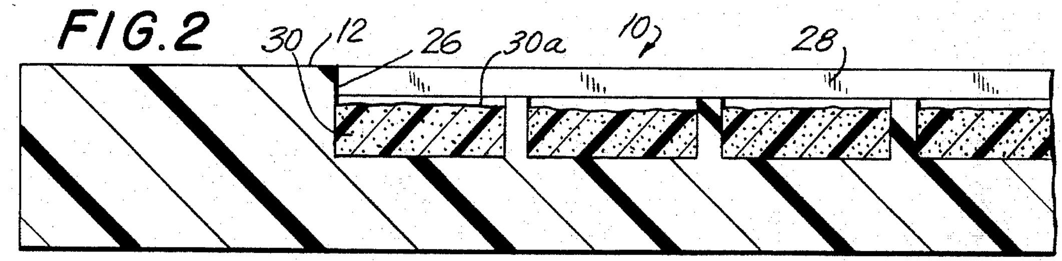
FIG. 3
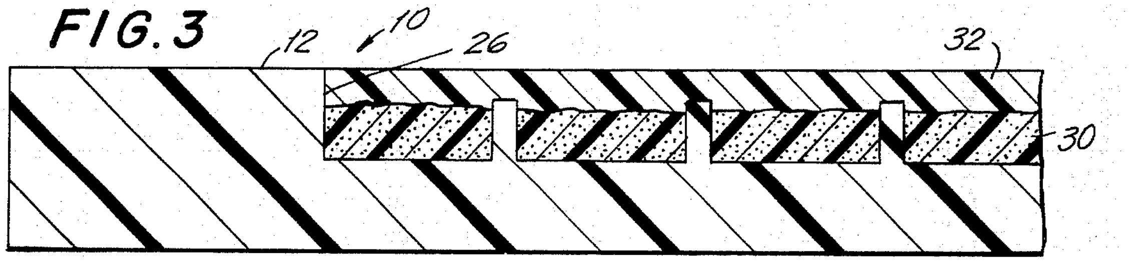
FIG. 4
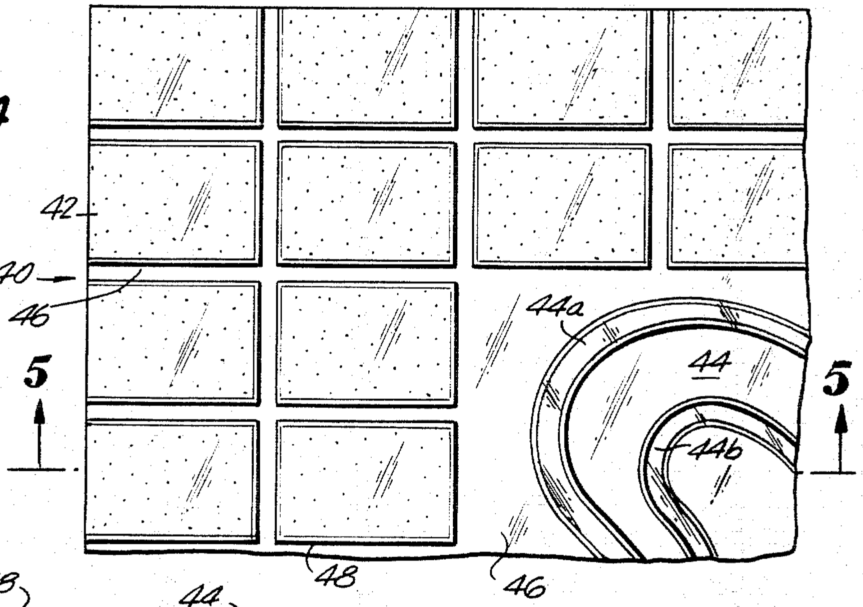
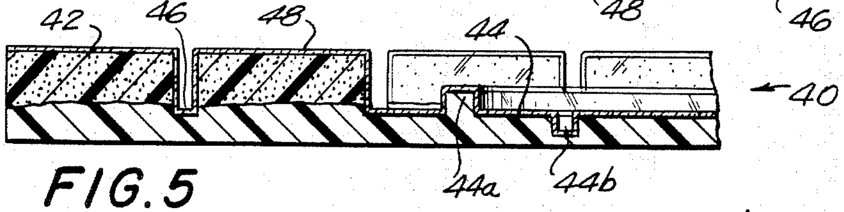
FIG. 5

FIG. 6
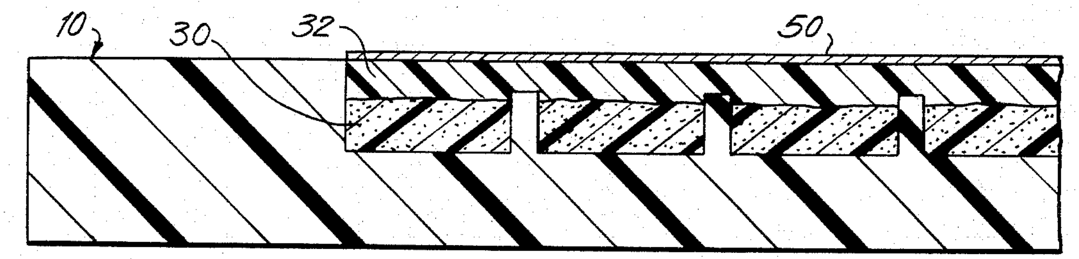
FIG. 7
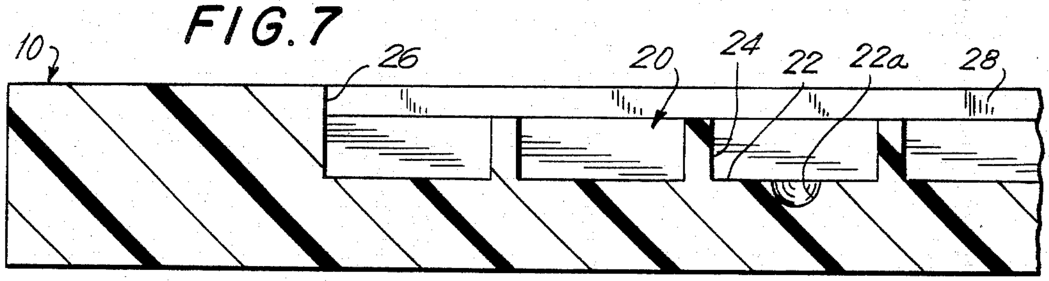
FIG. 8
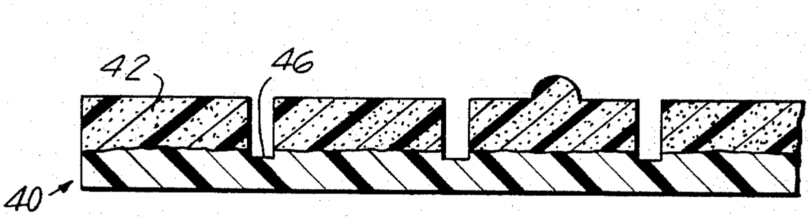
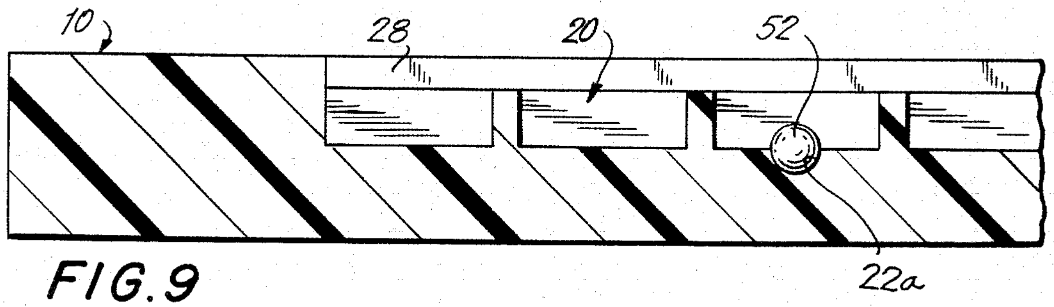
FIG. 9
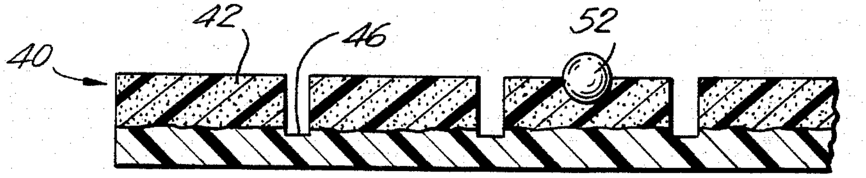
FIG. 10

MOSAIC STYLE ARTWORK

BACKGROUND OF THE INVENTION

This invention relates generally to a method for casting thermoset materials and, more particularly to a process for casting mosaic style artwork.

In contemporary design, it is quite fashionable to use mosaic artwork as a decorative technique in the arts and industry. Mosaic techniques are employed in such items as pill boxes, photo albums, book ends, wall plaques, jewelry, toys and figurines, to name just a few of the diverse applications of this art form. For these purposes, mosaic tiles may be arranged to provide intricate designs which accommodate surface contours of all configurations. Mosaic tiles permit further definition in the form of painted artwork.

However, in order to provide an aesthetic decorative mosaic finish, it is necessary to employ the skills of craftsmen to custom design and cement individual mosaic tiles to provide the desired ornamental finish. Such mosaic ornamentation is particularly expensive to provide in mass produced industrial products. For these reasons, although use of mosaic ornamentation can provide desirable decorative effects, such use has been limited by involved expenses.

Heretofore, the only alternative to costly custom installation of intricate mosaic patterns, has been the use of cast thermoset mosaic style patterns. In general it has been common to cast such standardized mosaic style finishes in molds including mosaic engravings and patterns. Although such thermoset castings may be fabricated much less expensively than custom installations using cut mosaic tiles, the aesthetic effect obtained by known casting methods have not provided a satisfactory mosaic style finish. In general, conventional casting methods provide mosaic finishes characterized by a uniform facade without the artistic intricacies and definition of custom mosaic artwork.

Accordingly, it is a broad object of the present invention to provide a new and improved method for casting mosaic style artwork.

A more specific object of the present invention is to provide a method for casting mosaic style artwork having the decorative "look" of more expensive custom installations, at a significantly decreased cost.

Yet another object of the present invention is to provide a method for casting mosaic style artwork which may be accomplished with manufacturing efficiencies by unskilled persons.

SUMMARY OF THE PRESENT INVENTION

These and other objects of the present invention are attained by providing a method for casting thermoset materials in engraved moldings. The method employs a mold having a deep etched mosaic pattern of engravings in order to obtain relief castings having a pattern of grooves simulating the look of mosaic tiles set in a cement base. A mosaic style finish is provided by independently casting a surface mosaic layer of thermoset material and a background layer of thermoset material. This is accomplished by casting a first layer of thermoset material having a depth which is less than the height of the mold engravings; curing the first layer to a gel consistency; and casting a second background layer of thermoset material which overlies the mold engravings. The thermoset materials are then cured and demolded to provide an integral casting having the distinct mosaic style ornamentation of the engraved mold.

In a preferred method of the invention, the mosaic and background thermoset layers are provided with different colorations and material textures in order to enhance the contrast between the mosaic style "tiles" and "cement" background of the casting. The mold employed in the method may also include engravings which provide a decorative motif in the mosaic style of the invention. Such decorative motifs, as well as individual mosaic tiles of the relief casting may be painted for aesthetic effect. For further ornamental effect, a porcelain glaze is applied to the front surface of the demolded casting to provide a mosaic appearance.

BRIEF DESCRIPTION OF THE DRAWINGS

The above brief description of the present invention will be more readily apparent by reference to the following detailed description of a preferred, but nonetheless illustrative, method of the invention when taken in conjunction with the following drawings wherein:

FIG. 1 is a horizontal cross-sectional view of a mold including a pattern of mosaic style engravings for use in the method of the present invention;

FIG. 2 shows the mold of FIG. 1 filled with a first layer of thermoset material;

FIG. 3 shows the mold of FIG. 2 filled with a second layer of thermoset material which overlies and is laminated to the first layer;

FIG. 4 is a mosaic style plaque provided by demolding the casting of FIG. 3;

FIG. 5 is a horizontal cross-sectional view taken substantially along the line of 5—5 of FIG. 4;

FIG. 6 is a view similar to FIG. 3 including a strengthening member attached to the second thermoset layer of material;

FIG. 7 is a mold for use in the process of the invention similar to FIG. 1 wherein the mosaic style engravings include semi-spherical depressions;

FIG. 8 is a cross-sectional view of mosaic artwork cast in the mold of FIG. 7 wherein the spherical depressions provide a pearlized exterior mosaic finish;

FIG. 9 is a further modification of the mold of FIG. 1 wherein spherical balls are positioned in base surfaces defined by the mosaic engravings;

FIG. 10 is a mosaic casting obtained in the method of this invention utilizing the mold of FIG. 9 wherein the spherical balls of the mold provide a pearlized mosaic exterior finish;

DESCRIPTION OF THE PREFERRED EMBODIMENTS

Figure 11:
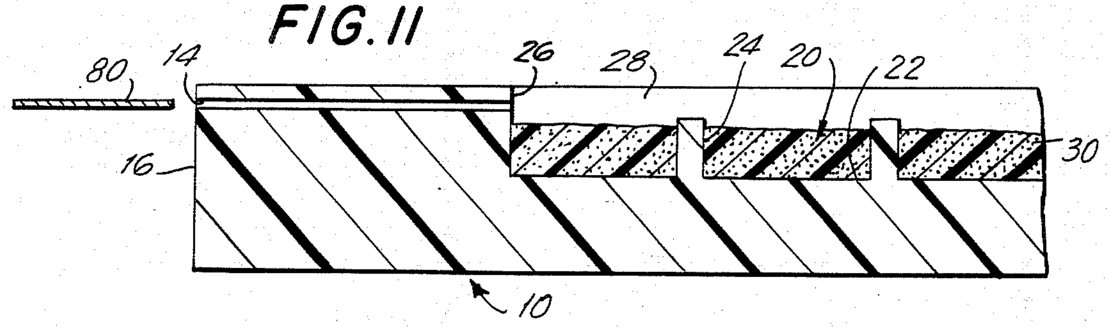
FIG. 11 is a view similar to FIG. 2 wherein the mold is provided with slits for receiving supporting members, a supporting member being shown positioned adjacent to the mold for insertion therein.
Figure 12:
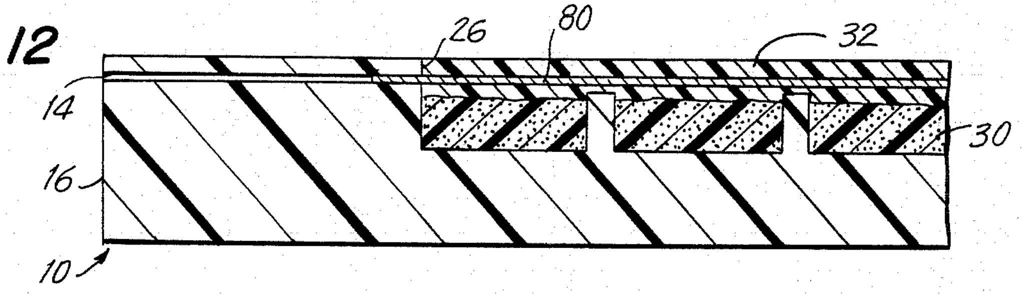
FIG. 12 is a view of FIG. 11 wherein the mold has been filled with a second thermoset layer of material and the supporting member positioned therein.

Referring now to the drawings, and more particularly, to FIGS. 1–5 thereof, there is illustrated a method for casting mosaic style artwork. The method employs a mold generally designated 10 and thermoset materials to fabricate mosaic style relief castings 40 (see FIG. 4). Although the casting method of the present invention has particular application in the production of mosaic finishes from thermoset materials, it will be appreciated that the method has general application in the production of castings having the look of custom set tile pieces, bricks and the like.

The mold 10 employed in the method of the invention includes patterns of engravings which define mosaic cavities 20 and a decorative motif (not shown). The cavities 20, which provide mosaic tile 42 ornamentation in relief castings, include base surfaces 22 and side surfaces 24. Decorative relief casting motifs, illustratively shown in FIG. 4 as reference numeral 44, accommodate preferred artistic expressions.

The mold engravings are recessed within the mold 10 relative to a top end surface 12. An engraving wall 26 extends around the perimeter of the recess in the mold 10 from base surfaces 22 to the top mold surface 12 to define a space 28 for casting a mosaic "cement" base 46. The recessed mosaic engraving and engraving wall 26, as will be described hereinafter, provide a relief casting having a surface ornamentation characterized by distinct mosaic tiles 42 and a decorative motif 44 set in a base 46, FIG. 4.

The mold 10 employed in the method of this invention may be fabricated of conventional materials including zinc, lead and tin alloys. It is preferred, however, to employ heat-cured silicone rubber mold compounds which provide economies in the manufacturing process. The present method employs such silicone rubber molds and conventional thermoset materials, such as polyester resins, to cast mosaic style artwork. In the method described hereinafter, conventional molding processes are utilized to provide novel mosaic style artwork of the invention. Such processes, may include spin or gravity casting, in open or closed molds.

According to the method of the invention, a first layer of thermoset material 30 is cast into the mold to a depth which substantially fills the mold cavities 20. Following the casting of the first thermoset layer 30, the thermoset material is cured by conventional processes to a gel consistency. For this purpose, conventional catalysts may be employed to provide a curing rate which accommodates manufacturing time requirements.

As the first layer of thermoset material 30 cures, a film of hardened thermoset material forms on the surface **30*a* of the mosaic layer of material. Additionally, it is found that in the casting of the first layer of thermoset material, residue thermoset materials may attach to the engraving side walls 24 at locations above the level of the first thermoset layer of material. For purposes of providing a uniform consistency in the first thermoset layer 30 and in order to provide a clean surface for further casting procedures, a bristol hair brush or cloth is employed to remove the surface film of thermoset material from the surface of the first thermoset layer 30*a* and engravings 24**.

Thereafter, a second layer of thermoset material 32 is cast into the mold 10 in overlying relation to the first thermoset layer. The second thermoset layer 32, shown in FIG. 3, completes the filling of mold cavities 20, and overlying molding space 28. Conventional procedures are then employed to cure the mold casting layers 30, 32 to permit demolding. During the curing process, the thermoset layers of material 30, 32 bond together to form an integral mold casting 40.

In order to provide contrast between the thermoset layers 32, 34, and resulting mosaic style of the casting 40, the thermoset layers are preferably cast of thermoset materials having different textures and color pigmentations. To this end, the preferred method of the invention employs a first thermoset layer 30 which includes a mixture of powdered stone (illustrated by stipplings in the drawings) for contrast with the base thermoset layer 32. Such contrast in the texture and color pigmentation of the layers 30, 32 provides a mosaic style casting 40 having the look of distinct mosaic tiles 42 set in a solid base 46.

For further ornamental enhancement, the relief casting 40 may also include a decorative motif 44 having a mosaic surface ornamentation provided by the process of this invention. The decorative motif shown in FIGS. 4,5 exemplifies the mosaic artwork which the present process accommodates. In the illustrated motif the casting has a relief surface configuration which includes relief engravings which are elevated **44*a* and recessed 44*b* relative to the background base 46** of thermoset material.

Following the demolding of the casting 40, a sharp instrument is employed to scrape and trim irregularities in the mosaic finish caused by imperfections in the molding process. For example, the casting base 46, provided by thermoset layer 32, may require scraping in order to remove thermoset materials which deposit in surface grooves. Similarly, the "mosaic tiles" may require trimming at their edges to remove irregularities in the surface contour of the casting.

In order to further enhance the mosaic style finish of the casting 40, the decorative motif of the casting may be painted to provide a realistic multi-color mosaic style finish. In a similar manner, the individual mosaic tiles may be painted for decorative effect. Finally, to provide the realistic aesthetic look of mosaic artwork, the mosaic casting 40 may be provided with a porcelain glaze 48 by conventional fusion processes.

Additional features which may be provided in mosaic castings fabricated in accordance with the present invention are shown in FIGS. 6–15.

In FIG. 6, there is shown a mosaic casting set in a mold 10 in which there is provided a strengthening member 50 laminated to the second background layer of thermoset material 32. The strengthening member 50, which may be fabricated of wood, fiberglass or other material, substantially conforms in dimension and contour of the mosaic style casting layers 30, 32. Such strengthening members advantageously may be employed in large castings for improved durability and structural integrity. In this regard, however, it will be appreciated that the need for such strengthening members 50 is dependent upon relative thickness of the thermoset casting and the specific characteristics of thermoset materials employed in the molding process.

In fabricating a mosaic casting including strengthening member 50, the first layer of thermoset material 30 is cast and cured to gel consistency as previously described. Thereafter, a second layer of thermoset material 32 is cast into the mold. Prior to curing the thermoset layer 32, the strengthening member 50 is positioned in overlying relation to the exterior surface of the thermoset layer 32 for bonding attachment thereto. The thermoset layers 30, 32 are then cured and demolded as previously described to provide a mosaic casting having improved structural strength.

Further variations of the molding process of the invention are shown in FIGS. 7–9. In FIG. 7 there is shown a mold 10 in which the mosaic tile cavities 20 are provided with spherical depressions 22*a* in cavity base surfaces 22. Mosaic castings 40 fabricated in this mold variation have a pearlized exterior finish, see FIG. 8. A further variation of this technique is shown in FIG. 9, wherein spherical balls 52, which may be fabricated of plastic, glass or the like, are inserted in the spherical depressions 22*a* in the base surfaces 22 of the mold. Mosaic style castings provided in this mold variation have a similar pearlized finish, see FIG. 10. This arrangement provides further advantages in that the surface of the mosaic casting may be enhanced with ornamental spherical balls 52 as an integral part of the moulding process.

In FIGS. 11–15 the method of the invention is employed to fabricate a "double-faced" mosaic style casting 60 having mosaic style engravings 62 on its front side and etched style engravings 70 on its back side. The casting also includes integral mounting members 80 which permit display of the casting in a base 90.

The double-faced mosaic casting of this embodiment of the invention the cast in the mold 10, of the type previously described, modified to permit introduction of mounting members 80 into the mosaic cast while molten. The mold includes spaced longitudinal cuts 14 which extend from an exterior sidewall 16 of the mold through perimeter engraving wall 26. The cuts are positioned in the sidewall 26 spaced above the mold cavities 20 for communication with the mold space 28. Engravings in the mold 10 provide mosaic style ornamentation of the invention which may include mosaic tiles 62 set in a "cement" base 66, and a decorative motif (not shown).

Figure 13:
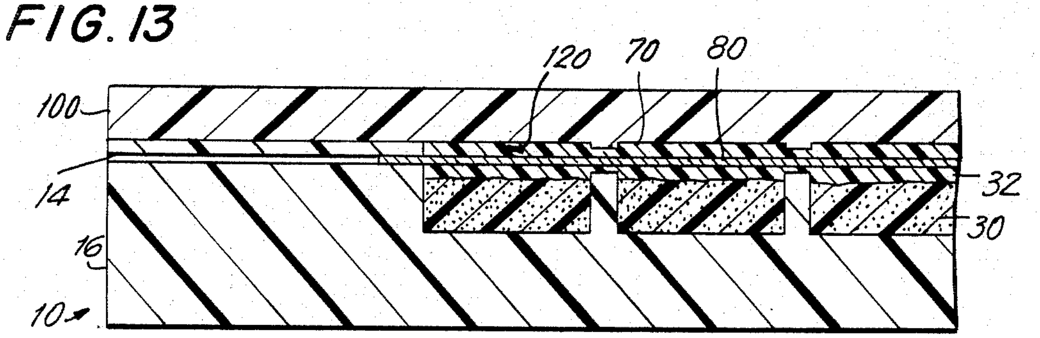
FIG. 13 shows arrangement of FIG. 12 wherein a second closed mold has been positioned overlying the second thermoset layer of material.
Figure 14:
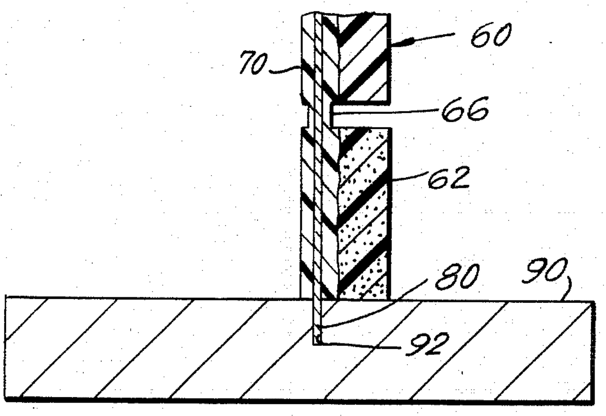
FIG. 14 shows a double-faced mosaic style casting obtained by demolding the mold arrangement of FIG. 13, the supporting members of the casting being positioned in a base for elevated display thereof.
Figure 15:
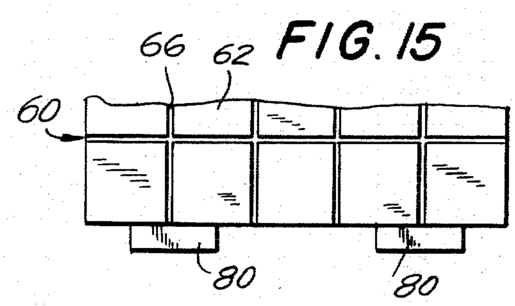
FIG. 15 is a partial elevational view of the double-faced casting shown in FIG. 14.

A closed mold 100 shown in FIG. 13, provides a mosaic style ornamentation on the back side of the casting 60. The closed mold 100 includes cavities 120 which provide relief engravings in the exterior thermoset layer of material 32.

In the molding process, the first thermoset layer of material 30 is cast and cured in accordance with the method of the invention. Thereafter, the second thermoset layer 32 is cast in the mold to a depth of the spaced cuts 14 to permit introduction of the mounting member 80 through the cuts without outflow of the thermoset material. The casting of the second thermoset layer 32 is then completed to secure the mounting members within the cast. Following this procedure and prior to curing the cast 60 to hardened strength, the closed mold 100 is positioned in overlying relation to the top side of mold 10 with the mold engravings in contact with the exterior surface of thermoset layer 32. The adjacent molds are then clamped in secure relation for curing of the casting. As an alternative to this procedure, the adjacent molds 10,100 may be secured together by a conventional glue. Demolding of the molds provides a double-faced thermoset casting 60 including integral mounting members 80, see FIG. 15.

The base 90 for mounting the double-faced mosaic casting may be fabricated of marble, wood or other suitable material. The base, shown in FIG. 14 includes slots 92 which are dimensioned to receive the mounting members 80 of the mosaic casting.

As a further modification, the double-faced art work may be provided with deep engraved mosaic ornamentation on both front and back sides. Such art work is fabricated by securing opposing mosaic castings together at their back side surfaces.

It will be appreciated therefore, that there is provided in the present invention a method for casting of mosaic artwork which achieves the objectives heretofore stated. In particular, the present invention discloses a method for fabricating a mosaic style finish having the look of custom mosaic installations. Advantageously, the mosaic style finish of the present method may include artistic motifs having a mosaic finish. Such decorative motifs may be hand painted for further enhancement of the mosaic artwork.

Advantageously, the method of this invention may be modified to accommodate conventionally known molding techniques. For example, the mold 10 employed in the present method may be provided with mold engravings for receiving a frame for the mosaic castings fabricated in accordance with the method of the invention. In this manner, a frame for the mosaic artwork may be positioned within the mold in advance of casting of thermoset materials in such a manner that the thermoset materials are directly laminated to the frame as an integral finished unit. In like manner, mosaic artwork of the invention may be cast directly into a finished product provided with a mold adapted for this purpose.

Numerous modifications are possible in light of the above disclosure. Thus, although the mold 10 of the present invention is shown as having a generally planar configuration, the process of this invention may also be adapted for use in molds of all geometric surface configurations. Similarly, strengthening structures other than member 50 may be employed to provide added structural integrity to larger mosaic castings. For example, a wire mesh may be positioned within the second thermoset layer of material 32. Alternatively, framing members may be provided to strengthen mosaic castings. It is to be understood, therefore, that the above described embodiments are merely illustrative and other embodiments may be devised by those skilled in the art, without departing from the spirit or scope of the present invention, as set forth in the appended claims.

What is claimed is:

1. Mosaic artwork including a decorative motif, manufactured by a casting method employing a mold having a mosaic pattern of engravings which define mosaic tile cavities and the decorative motif, the mold cavities including base surfaces which have spherical depressions which provide a pearlized relief casting finish, comprising the steps of:

(a) casting a first layer of thermosetting material in the engraved mold, the first thermosetting layer having a depth less than the height of the mosaic pattern mold engravings;

(b) curing the first mold layer to a gel consistency;

(c) brushing the top surfaces of the first thermosetting layer to remove surface films formed in the curing process;

(d) casting a second layer of thermosetting material in the engraved mold, the second layer having sufficient depth to overlie the mosaic pattern mold engravings, the second layer also having a different coloration from that of the first thermosetting layer;

(e) positioning a strengthening member on the exterior surface of the second thermosetting layer;

(f) curing the first and second mold layers to cured strength;

(g) demolding the thermoset materials to provide a relief cast having distinct mosaic style impressions, decorative motif, and pearlized ornamentation of the mold; and (h) applying a porcelain glaze to the front surface of the demolded casting.

2. Mosaic artwork manufactured in accordance with the method of claim 1, wherein the mold cavities include base surfaces having spherical depression, comprising the additional step of inserting spherical balls into the spherical depressions prior to casting the first thermosetting layer, thereby obtaining a pearlized finish in the demolded casting.

3. A pearlized mosaic article having a decorative motif, made by a method employing a mold having a mosaic pattern of engravings which define mosaic tile cavities and the decorative motif, the mold cavities including base surfaces which have spherical depressions which provide a pearlized relief casting finish, comprising the steps of:

(a) casting a first layer of thermosetting material in the engraved mold, the first thermosetting layer having a depth less than the height of the mosaic pattern mold engravings;

(b) curing the first mold layer to a gel consistency;

(c) brushing the top surfaces of the first thermosetting layer to remove surface films formed in the curing process;

(d) casting a second layer of thermosetting material in the engraved mold, the second layer having sufficient depth to overlie the mosaic pattern mold engravings, the second layer also having a different coloration from that of the first thermosetting layer;

(e) positioning a strengthening member on the exterior surface of the second thermosetting layer;

(f) curing the first and second mold layers to cured strength;

(g) demolding the thermoset materials to provide a relief cast having distinct mosaic style impressions, decorative motif, and pearlized ornamentation of the mold; and (h) applying a porcelain glaze to a front surface of the demolded casting, said front surface being a surface of said article shaped by a portion of said mold having said mosaic pattern of engravings thereon.

4. A mosaic article having a decorative motif, made by a method employing a mold having a mosaic pattern of engravings which define mosaic tile cavities and the decorative motif, the mold cavities including base surfaces which have spherical depressions, comprising the steps of:

(a) inserting spherical balls into the spherical depressions;

(b) casting a first layer of thermosetting material in the engraved mold, the first thermosetting layer having a depth less than the height of the mosaic pattern mold engravings;

(c) curing the first mold layer to a gel consistency;

(d) brushing the top surfaces of the first thermosetting layer to remove surface films formed in the curing process;

(e) casting a second layer of thermosetting material in the engraved mold, the second layer having sufficient depth to overlie the mosaic pattern mold engravings, the second layer also having a different coloration from that of the first thermosetting layer;

(f) positioning a strengthening member on the exterior surface of the second thermosetting layer;

(g) curing the first and second mold layers to cured strength;

(h) demolding the thermoset materials to provide a relief cast having distinct mosaic style impressions and decoration motif of the mold; and (i) applying a porcelain glaze to a front surface of the demolded casting, said front surface being a surface of said articles shaped by a portion of said mold having said mosaic pattern thereon.

* * * * *